(12) United States Patent
Park

(10) Patent No.: US 11,519,496 B2
(45) Date of Patent: Dec. 6, 2022

(54) HYDRAULIC CONTROL DEVICE FOR AUTO TRANSMISSION

(71) Applicant: Hyundai Transys Inc., Hwaseong-si (KR)

(72) Inventor: Sang Seok Park, Hwaseong-si (KR)

(73) Assignee: Hyundai Transys Inc., Hwaseong-si (KR)

( * ) Notice: Subject to any disclaimer, the term of this patent is extended or adjusted under 35 U.S.C. 154(b) by 232 days.

(21) Appl. No.: 17/024,125

(22) Filed: Sep. 17, 2020

(65) Prior Publication Data

US 2021/0080000 A1    Mar. 18, 2021

(30) Foreign Application Priority Data

Sep. 18, 2019  (KR) ........................ 10-2019-0114859

(51) Int. Cl.
*F16H 61/00* (2006.01)
*F16H 61/48* (2006.01)
*F16H 57/04* (2010.01)

(52) U.S. Cl.
CPC ..... *F16H 61/0021* (2013.01); *F16H 57/0435* (2013.01); *F16H 57/0446* (2013.01); *F16H 61/48* (2013.01); *F16H 2061/0037* (2013.01)

(58) Field of Classification Search
CPC ................ F16H 61/0021; F16H 61/48; F16H 2061/0037; F16H 2061/0034; F16H 57/0435; F16H 57/0446; F16H 41/30
See application file for complete search history.

(56) References Cited

U.S. PATENT DOCUMENTS

| 6,668,978 B2 * | 12/2003 | Fessler ................ F16H 61/0021 |
| | | 74/467 |
| 2011/0168509 A1 * | 7/2011 | Moorman ............. F16H 61/143 |
| | | 192/3.3 |

FOREIGN PATENT DOCUMENTS

| CN | 102422059 A | * | 4/2012 | ......... F16H 61/0021 |
| DE | 10 2011 007 985 A1 | | 9/2011 | |
| JP | 2012-241798 A | | 12/2012 | |
| KR | 100551277 B1 | * | 10/2006 | ............. F16H 61/14 |
| KR | 10-2013-0055148 A | | 5/2013 | |

(Continued)

OTHER PUBLICATIONS

Office Action dated Mar. 1, 2022 in German Application No. 10 2020 124 084.8.

*Primary Examiner* — Tisha D Lewis
(74) *Attorney, Agent, or Firm* — Saliwanchik, Lloyd & Eisenschenk

(57) ABSTRACT

A hydraulic control device for an auto transmission may include: an oil pump unit configured to supply oil; a line pressure control unit configured to form line pressure using the oil supplied from the oil pump unit; a lubricating pressure control unit configured to form lubricating pressure using the oil passing through the line pressure control unit; a reducing pressure control unit configured to form reducing pressure using the oil passing through the lubricating pressure control unit; a damper control pressure control unit configured to form damper control pressure using the oil supplied from the oil pump unit; a switch unit configured to supply the lubricating pressure or the reducing pressure to a torque converter; a collection unit configured to collect the lubricating pressure; and a retention unit connected to the switch unit, and configured to retain the lubricating pressure of the torque converter.

14 Claims, 5 Drawing Sheets

(56) References Cited

FOREIGN PATENT DOCUMENTS

| KR | 20140012397 A | * | 3/2014 | ............. F16H 57/04 |
|---|---|---|---|---|
| KR | 10-1713738 B1 | | 3/2017 | |

* cited by examiner

HYDRAULIC CONTROL DEVICE FOR AUTO TRANSMISSION

CROSS-REFERENCE TO RELATED APPLICATION

This application claims priority from and the benefit of Korean Patent Application No. 10-2019-0114859, filed on Sep. 18, 2019, which is hereby incorporated by reference for all purposes as if set forth herein.

BACKGROUND

Field

Exemplary embodiments of the present disclosure relate to a hydraulic control device for an auto transmission, and more particularly, to a hydraulic control device for an auto transmission, which can supply a suitable amount of lubricant oil according to a vehicle traveling condition, and thus reduce a pump load.

Discussion of the Background

In general, an auto transmission includes a shift control device which controls hydraulic pressure by controlling a plurality of solenoid valves according to the traveling speed of a vehicle, the open rate of a throttle valve and overall detection conditions, such that the gearshift of a target shift stage is operated to automatically shift gears.

That is, when a driver changes the range of a select lever to a desired shift stage, hydraulic pressure, which is supplied from an oil pump while the hydraulic control system changes ports of a manual valve, selectively operates various operating elements of a gearshift mechanism according to duty control for the plurality of solenoid valves, thereby shifting gears.

In the relate art, a flow rate of lubricant oil cannot be controlled according to a traveling condition, and a constant amount of lubricating pressure is provided regardless of whether the vehicle travels at low or high speed. Therefore, there is a need for a device capable of solving the problem.

The related art of the present disclosure is disclosed in Korean Patent Application No. 2013-0055148 published on May 28, 2013 and entitled "Hydraulic Control Device for Auto Transmission".

SUMMARY

Various embodiments are directed to a hydraulic control device for an auto transmission, which can supply a suitable amount of lubricant oil according to a vehicle traveling condition, and thus reduce a pump load.

In an embodiment, a hydraulic control device for an auto transmission may include: an oil pump unit configured to supply oil; a line pressure control unit configured to form line pressure using the oil supplied from the oil pump unit; a lubricating pressure control unit configured to form lubricating pressure using the oil passing through the line pressure control unit; a reducing pressure control unit configured to form reducing pressure using the oil passing through the lubricating pressure control unit; a damper control pressure control unit configured to form damper control pressure using the oil supplied from the oil pump unit; a switch unit configured to supply the lubricating pressure or the reducing pressure to a torque converter while being operated by the damper control pressure; a collection unit configured to collect the lubricating pressure; and a retention unit connected to the switch unit, and configured to retain the lubricating pressure of the torque converter.

The line pressure control unit may include: a line pressure flow path connected to the oil pump unit, and configured to guide oil; and a line pressure valve configured to open/close the line pressure flow path.

The lubricating pressure control unit may include: a lubricating pressure flow path configured to connect the line pressure valve and the switch unit so as to guide oil; and a lubricating pressure valve configured to open/close the lubricating pressure flow path.

The reducing pressure control unit may include: a reducing pressure flow path configured to connect the lubricating pressure flow path and the switch unit so as to guide oil; and a reducing pressure valve configured to open/close the reducing pressure flow path.

The damper pressure control unit may include: a damper pressure flow path configured to connect the line pressure flow path, the switch unit and the torque converter so as to guide oil; and a damper pressure valve configured to open/close the damper pressure flow path.

When a damper clutch operated by the damper control pressure is turned off, the switch unit may connect an inlet of the torque converter and the lubricating pressure flow path, and connect an outlet of the torque converter and the collection unit.

When the damper clutch operated by the damper control pressure is turned on, the switch unit may connect the inlet of the torque converter and the reducing pressure flow path, and connect the lubricating pressure flow path and the collection unit.

The switch unit may include: an off switch unit configured to connect the inlet of the torque converter and the lubricating pressure control unit, and connect the outlet of the torque converter and the collection unit; and an on switch unit configured to connect the inlet and the reducing pressure control unit, and connect the lubricating pressure control unit and the collection unit.

The off switch unit may include: a first off switch connected to the reducing pressure control unit, and configured to restrict the movement of the reducing pressure; a second off switch configured to connect the inlet and the lubricating pressure control unit, and guide the lubricating pressure to the inlet; a third off switch configured to connect the outlet and the collection unit, and guide hydraulic pressure, discharged from the outlet, to the collection unit; and a fourth off switch connected to the retention unit, and configured to restrict the movement of hydraulic pressure of the retention unit.

The on switch unit may include: a first on switch configured to connect the reducing pressure control unit and the inlet, and guide the reducing pressure to the inlet; a second on switch configured to connect the lubricating pressure control unit and the collection unit, and guide the lubricating pressure to the collection unit; and a third on switch configured to connect the outlet and the retention unit.

The retention unit may be a check valve configured to discharge the oil of the outlet, when pressure thereof is equal to or more than preset pressure.

In accordance with the embodiment of the present disclosure, the hydraulic control device for an auto transmission in accordance with the embodiment of the present disclosure can efficiently manage the amount of oil which is supplied as the switch unit is switched according to the on or off state of the damper clutch.

BRIEF DESCRIPTION OF THE DRAWINGS

FIG. 3 is a diagram illustrating the case in which the damper clutch in the hydraulic control device for an auto transmission in accordance with the embodiment of the present disclosure is turned on.

DETAILED DESCRIPTION OF THE ILLUSTRATED EMBODIMENTS

Hereinafter, a hydraulic control device for an auto transmission will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
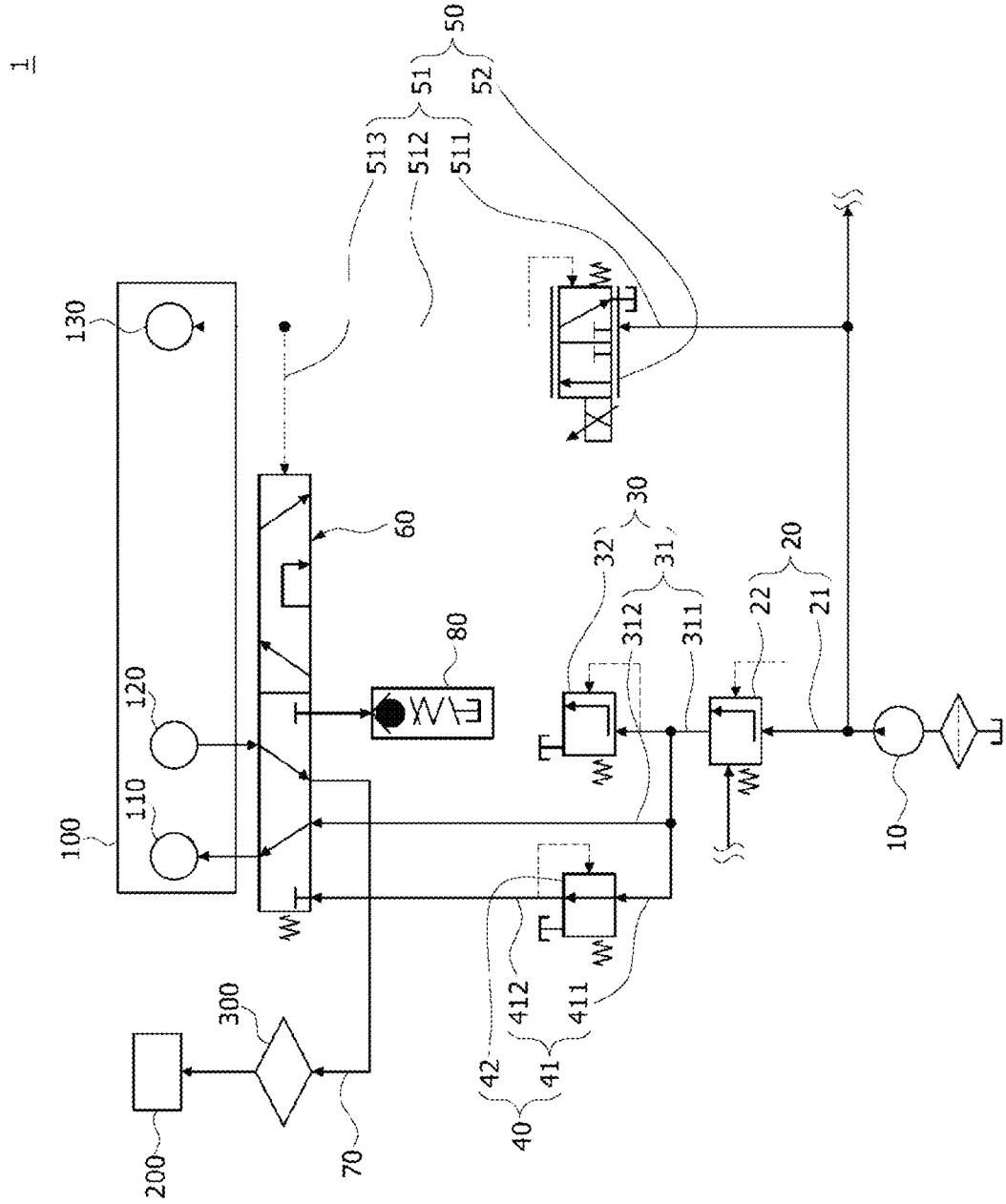
FIG. 1 is a diagram schematically illustrating a hydraulic control device for an auto transmission in accordance with the embodiment of the present disclosure.
Figure 2:
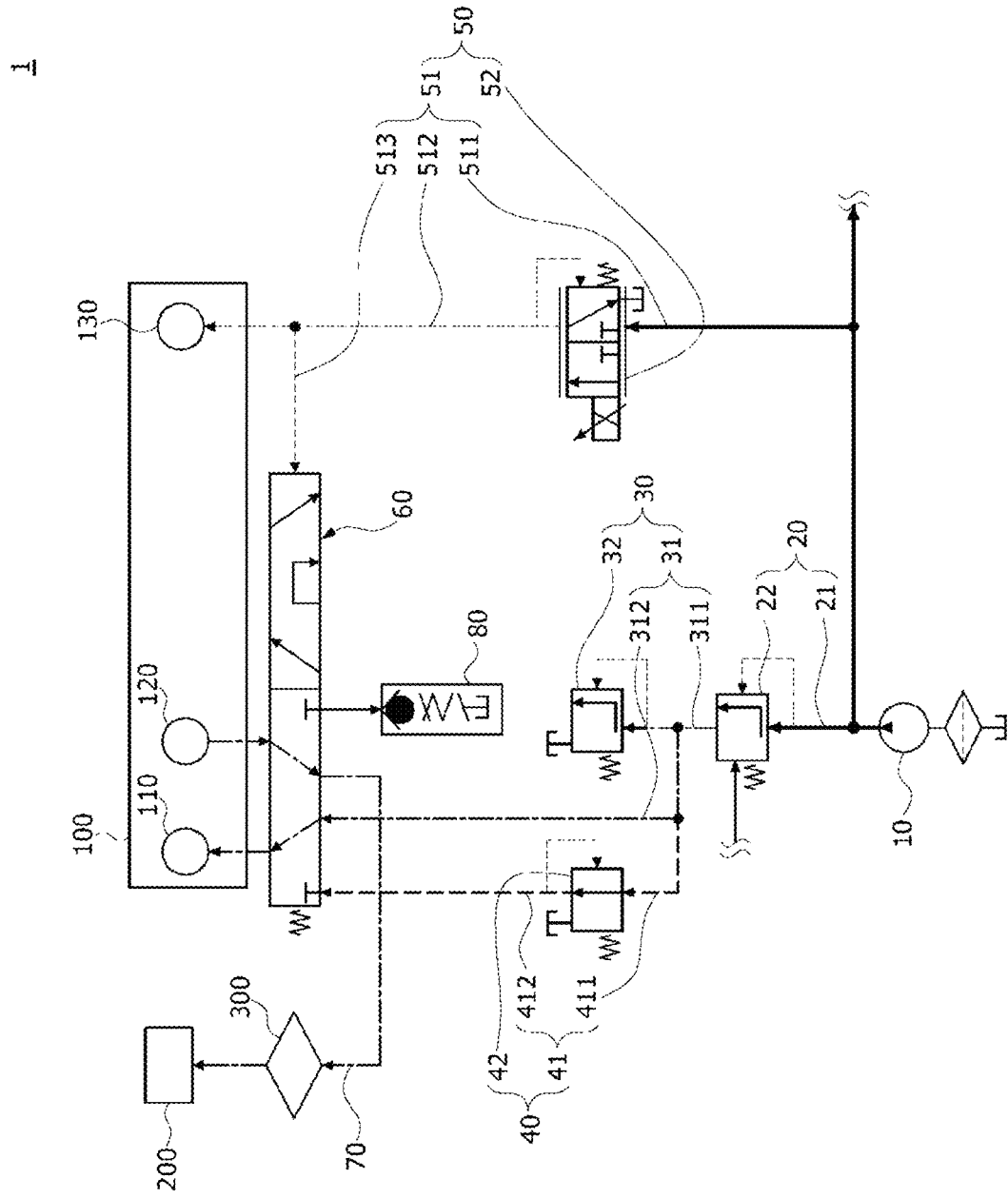
FIG. 2 is a diagram illustrating the case in which a damper clutch in the hydraulic control device for an auto transmission in accordance with the embodiment of the present disclosure is turned off.
Figure 3:
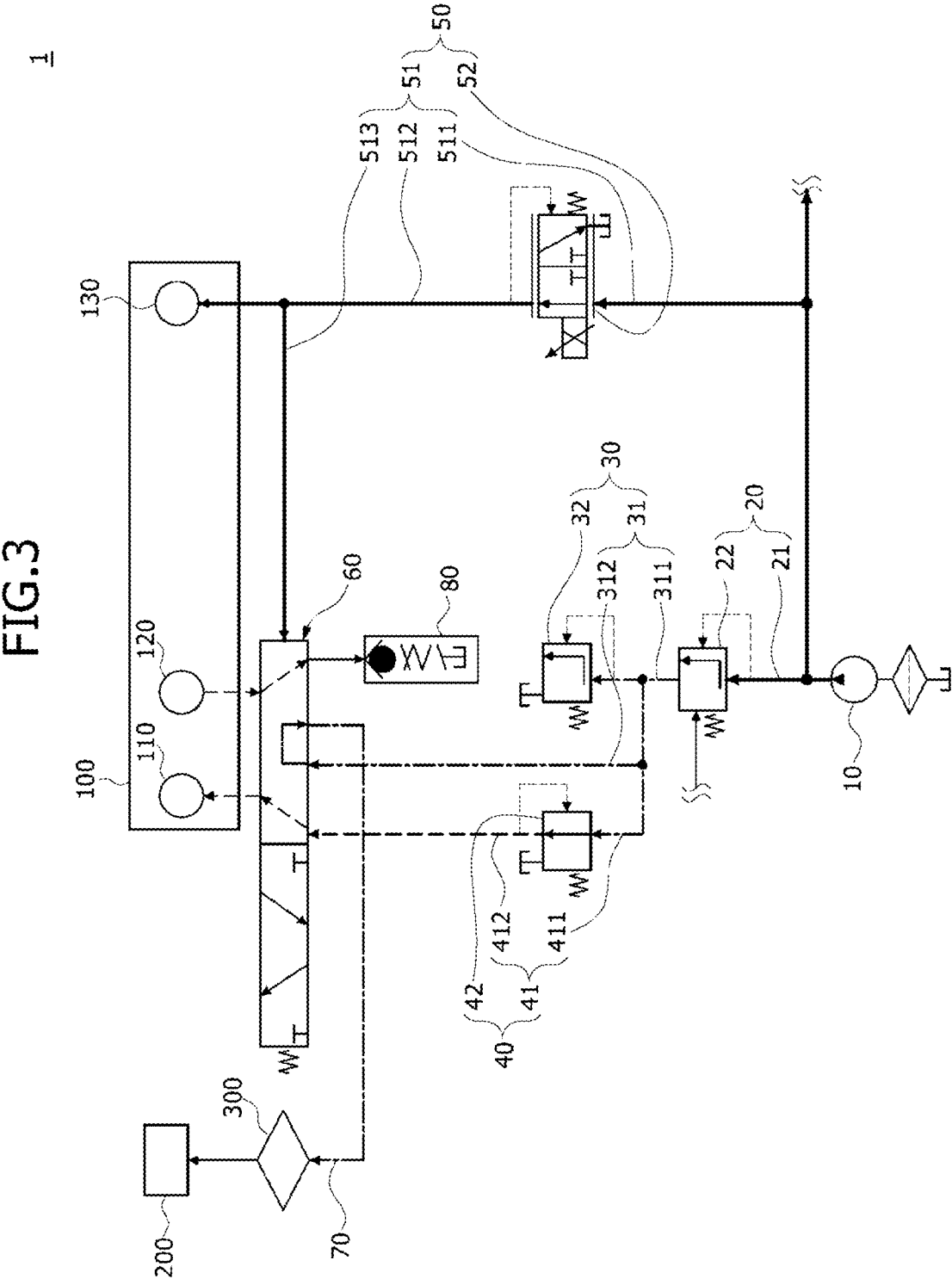

FIG. 1 is a diagram schematically illustrating a hydraulic control device for an auto transmission in accordance with the embodiment of the present disclosure, FIG. 2 is a diagram illustrating the case in which a damper clutch in the hydraulic control device for an auto transmission in accordance with the embodiment of the present disclosure is turned off, and FIG. 3 is a diagram illustrating the case in which the damper clutch in the hydraulic control device for an auto transmission in accordance with the embodiment of the present disclosure is turned on.

Referring to FIGS. 1 to 3, the hydraulic control device 1 for an auto transmission in accordance with the embodiment of the present disclosure includes an oil pump unit 10, a line pressure control unit 20, a lubricating pressure control unit 30, a reducing pressure control unit 40, a damper pressure control unit 50, a switch unit 60, a collection unit 70 and a retention unit 80.

The oil pump unit 10 supplies oil. For example, the oil pump unit 10 is mounted in a vehicle body, and may transfer oil stored therein to a destination by pumping the oil. The line pressure control unit 20 forms line pressure using the oil supplied from the oil pump unit 10. The lubricating pressure control unit 30 forms lubricating pressure using the oil passing through the line pressure control unit 20. The reducing pressure control unit 40 forms reducing pressure using the oil passing through the lubricating pressure control unit 30. The damper pressure control unit 50 forms damper control pressure using the oil supplied from the oil pump unit 10. At this time, the damper control pressure may control a damper clutch 130 of a torque converter 100. The switch unit 60 supplies the lubricating pressure or reducing pressure to the torque converter 100 while operated by the damper control pressure. The collection unit 70 collects the lubricating pressure, and the retention unit 80 retains the lubricating pressure of the torque converter 100.

The line pressure control unit 20 in accordance with the embodiment of the present disclosure includes a line pressure flow path 21 and a line pressure valve 22. The line pressure flow path 21 is connected to the oil pump unit 10 so as to guide oil, and the line pressure valve 22 opens/closes the line pressure flow path 21. For example, the line pressure flow path 21 has one end connected to the oil pump unit 10 and the other end connected to the line pressure valve 22.

The lubricating pressure control unit 30 in accordance with the embodiment of the present disclosure includes a lubricating pressure flow path 31 and a lubricating pressure valve 32. The lubricating pressure flow path 31 connects the line pressure valve 22 and the switch unit 60 so as to guide oil, and the lubricating pressure valve 32 opens/closes the lubricating pressure flow path 31. For example, the lubricating pressure flow path 31 may include a first lubricating flow path 311 and a second lubricating flow path 312. The first lubricating flow path 311 has one end connected to the line pressure valve 22 and the other end connected to the lubricating pressure valve 32, and the second lubricating flow path 312 has one end connected to the first lubricating flow path 311 and the other end connected to the switch unit 60.

The reducing pressure control unit 40 in accordance with the embodiment of the present disclosure includes a reducing pressure flow path 41 and a reducing pressure valve 42. The reducing pressure flow path 41 connects the lubricating pressure flow path 31 and the switch unit 60 so as to guide oil, and the reducing pressure valve 42 opens/closes the reducing pressure flow path 41. For example, the reducing pressure flow path 41 may include a first reducing flow path 411 and a second reducing flow path 412. The first reducing flow path 411 has one end connected to the second lubricating flow path 312 and the other end connected to the reducing pressure valve 42, and the second reducing flow path 412 has one end connected to the reducing pressure valve 42 and the other end connected to the switch unit 60.

The damper pressure control unit 50 in accordance with the embodiment of the present disclosure includes a damper pressure flow path 51 and a damper pressure valve 52. The damper pressure flow path 51 connects the line pressure flow path 21, the switch unit 60 and the torque converter 100 so as to guide oil, and the damper pressure valve 52 opens/closes the damper pressure flow path 51. For example, the damper pressure flow path 51 may include a first damper flow path 511, a second damper flow path 512 and a third damper flow path 513. The first damper flow path 511 has one end connected to the line pressure flow path 21 and the other end connected to the damper pressure valve 52, the second damper flow path 512 has one end connected to the damper pressure valve 52 and the other end connected to the torque converter 100, and the third damper flow path 513 has one end connected to the second damper flow path 512 and the other end connected to the switch unit 60. At this time, the second damper flow path 512 may provide the damper control pressure to the damper clutch 130 of the torque converter 100.

The switch unit 60 is switched by the damper control pressure, and the collection unit 70 supplies lubricant oil to a power train 200. For example, the collection unit 70 may have one end connected to the switch unit 60 and the other end connected to the power train 200 through a cooler 300.

When the damper clutch 130 operated by the damper control pressure is turned off, the damper pressure valve 52 closes the damper pressure flow path 51. The switch unit 60 connects an inlet 110 of the torque converter 100 to the lubricating pressure flow path 31, and connects an outlet 120 of the torque converter 100 to the collection unit 70.

In the above-described state, the oil discharged from the oil pump unit 10 is supplied to the inlet 110 through the lubricating pressure flow path 31, discharged to the outlet 120, and moved through the collection unit 70 so as to lubricate the power train 200 (see FIG. 2).

That is, when the damper clutch 130 is turned off, a difference in relative rotation between an engine and a turbine is increased to generate much heat. Therefore, a sufficient amount of lubricating pressure may be supplied to the torque converter 100.

When the damper clutch 130 operated by the damper control pressure is turned on, the damper pressure valve 52 opens the damper pressure flow path 51. Thus, the switch unit 60 is switched to connect the inlet 110 of the torque converter 100 to the reducing pressure flow path 41, and to connect the lubricating pressure flow path 31 to the collection unit 70. At this time, the retention unit 80 is connected to the outlet 120 of the torque converter 100, and may serve as a check valve which discharges oil when pressure thereof is equal to or more than preset pressure. Therefore, the retention unit 80 may constantly retain the lubricating pressure of the torque converter 100.

In the above-described state, the oil discharged from the oil pump unit 10 is supplied to the inlet 110 through the reducing pressure flow path 41, and discharged to the outside by the retention unit 80 when the pressure thereof is equal to or more than the preset pressure. Furthermore, the oil having passed through the lubricating pressure flow path 31 is moved to the collection unit 70 through the switch unit 60, and then supplied to the power train 200 (see FIG. 3).

That is, when the damper clutch 130 is turned on, a difference in relative rotation between the engine and the turbine is decreased. Thus, while the internal lubricating pressure of the torque converter 100 is retained at low pressure, the damper control pressure may be induced as low pressure. Therefore, since the line pressure is formed as low pressure, the load of the oil pump unit 10 can be reduced.

Figure 4:
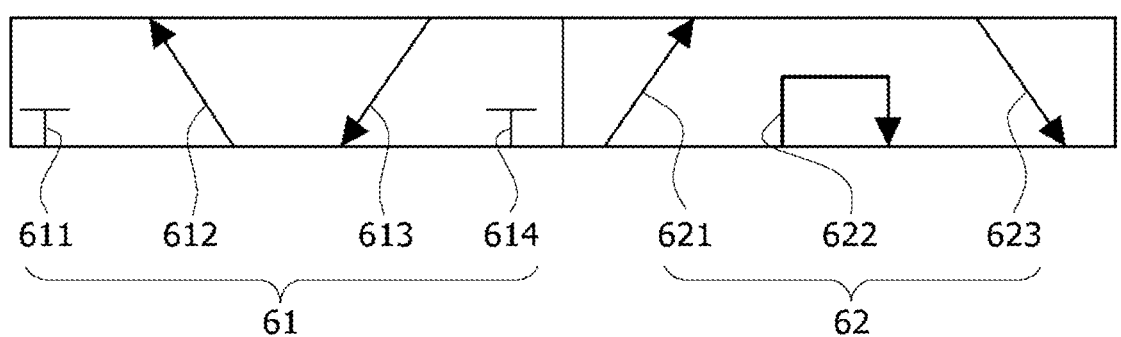
FIG. 4 is a diagram schematically illustrating a switch unit in accordance with the embodiment of the present disclosure.

FIG. 4 is a diagram schematically illustrating the switch unit in accordance with the embodiment of the present disclosure. Referring to FIGS. 1 to 4, the switch unit 60 in accordance with the embodiment of the present disclosure may include an off switch unit 61 and an on switch unit 62.

The off switch unit 61 connects the inlet 110 of the torque converter 100 and the lubricating pressure control unit 30, and connects the outlet 120 of the torque converter 100 and the collection unit 70, when the damper clutch 130 operated by the damper control pressure is turned off.

The on switch unit 62 connects the inlet 110 and the reducing pressure control unit 40, and connects the lubricating pressure control unit 30 and the collection unit 70, when the damper clutch 130 operated by the damper control pressure is turned on.

More specifically, the off switch unit 61 may include a first off switch 611, a second off switch 612, a third off switch 613 and a fourth off switch 614.

The first off switch 611 is connected to the reducing pressure control unit 40, and restricts the movement of the reducing pressure. For example, when the damper clutch 130 operated by the damper control pressure is turned off, the first off switch 611 may be connected to the second lubricating flow path 312, and restrict the supply of oil to the torque converter 100.

The second off switch 612 connects the inlet 110 and the lubricating pressure control unit 30, and guide the lubricating pressure to the inlet 110. For example, when the damper clutch 130 operated by the damper control pressure is turned off, the second off switch 612 may connect the second lubricating flow path 312 and the inlet 110, and supply oil to the torque converter 100.

The third off switch 613 connects the outlet 120 and the collection unit 70, and guides hydraulic pressure, discharged from the outlet 120, to the collection unit 70. For example, when the damper clutch 130 operated by the damper control pressure is turned off, the third off switch 613 may connect the outlet 120 and the collection unit 70, such that the oil discharged from the torque converter 100 is moved to the collection unit 70.

The fourth off switch 614 is connected to the retention unit 80, and restricts the movement of the hydraulic pressure of the retention unit 80. For example, when the damper clutch 130 operated by the damper control pressure is turned off, the fourth off switch 614 may be connected to the retention unit 80 and prevent leakage of the oil stored in the retention unit 80.

The on switch unit 62 may include a first on switch 621, a second on switch 622 and a third on switch 623.

The first on switch 621 connects the reducing pressure control unit 40 and the inlet 110, and guides the reducing pressure to the inlet 110. For example, when the damper clutch 130 operated by the damper control pressure is turned on, the first on switch 621 may connect the second reducing flow path 412 and the inlet 110, and supply oil to the torque converter 100.

The second on switch 622 connects the lubricating pressure control unit 30 and the collection unit 70, and guides the lubricating pressure to the collection unit 70. For example, when the damper clutch 130 operated by the damper control pressure is turned on, the second on switch 622 may connect the second lubricating flow path 312 and the collection unit 70, and induce the oil, having passed through the second lubricating flow path 312, not to be supplied to the torque converter 100, but to be directly moved to the collection unit 70.

The third on switch 623 connects the outlet 120 and the retention unit 80. For example, when the damper clutch 130 operated by the damper control pressure is turned on, the third on switch 623 connects the outlet 120 and the retention unit 80. At this time, when the pressure of the retention unit 80 is equal to or more than preset pressure, the oil of the torque converter 100 is moved to the retention unit 80. Therefore, the hydraulic pressure of the torque converter 100 may be constantly retained.

Figure 5:
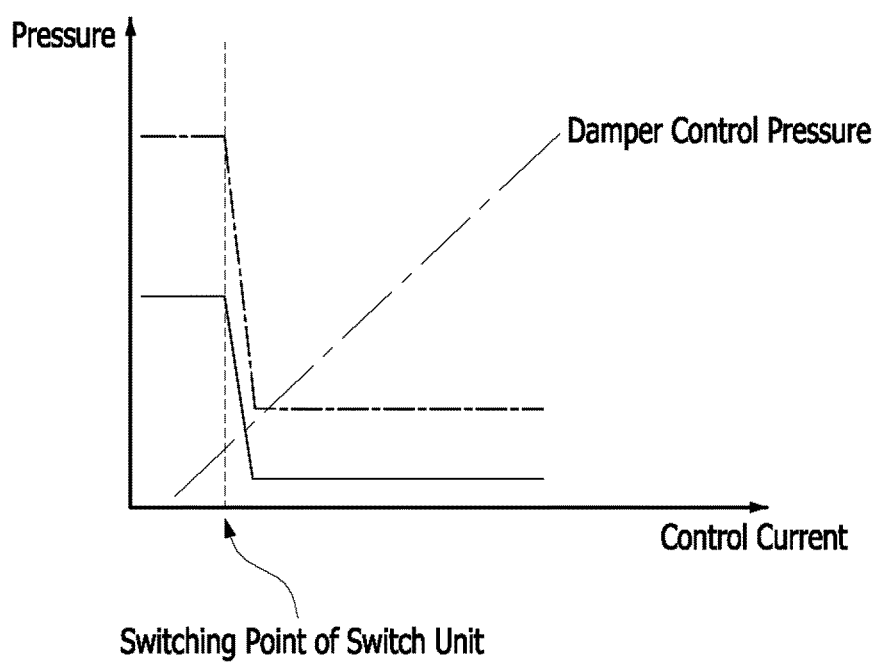
FIG. 5 is a graph schematically illustrating a change in pressure of an inlet and outlet of a torque converter when the hydraulic control device for an auto transmission in accordance with the embodiment of the present disclosure controls the damper clutch.

FIG. 5 is a graph schematically illustrating a change in pressure of the inlet and outlet of the torque converter when the hydraulic control device for an auto transmission in accordance with the embodiment of the present disclosure controls the damper clutch. Referring to FIG. 5, the pressure applied to the inlet 110 and the outlet 120 is rapidly reduced at a point of time that the switch unit 60 is switched.

The hydraulic control device 1 for an auto transmission in accordance with the embodiment of the present disclosure can efficiently manage the amount of oil which is supplied as the switch unit 60 is switched according to the on or off state of the damper clutch 130.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A hydraulic control device for an auto transmission, comprising:
   an oil pump unit configured to supply oil;
   a line pressure control unit configured to form line pressure using the oil supplied from the oil pump unit;
   a lubricating pressure control unit configured to form lubricating pressure using the oil passing through the line pressure control unit;
   a reducing pressure control unit configured to form reducing pressure using the oil passing through the lubricating pressure control unit;
   a damper control pressure control unit configured to form damper control pressure using the oil supplied from the oil pump unit;
   a switch unit configured to supply the lubricating pressure or the reducing pressure to a torque converter while being operated by the damper control pressure;
   a collection unit configured to collect the lubricating pressure; and
   a retention unit connected to the switch unit, and configured to retain the lubricating pressure of the torque converter,
   wherein the reducing pressure control unit comprises:
      a reducing pressure flow path connected to the switch unit and directly connected to a lubricating pressure flow path of the lubricating pressure control unit so as to guide oil, the lubricating flow path being directly connected to a line pressure flow path of the line pressure control unit, and the line pressure flow path being connected to the oil pump unit; and
      a reducing pressure valve configured to open/close the reducing pressure flow path.

2. The hydraulic control device of claim 1, wherein the line pressure control unit comprises:
   the line pressure flow path connected to the oil pump unit, and configured to guide oil; and
   a line pressure valve configured to open/close the line pressure flow path.

3. The hydraulic control device of claim 2, wherein the lubricating pressure control unit comprises:
   the lubricating pressure flow path configured to connect the line pressure valve and the switch unit so as to guide oil; and
   a lubricating pressure valve configured to open/close the lubricating pressure flow path.

4. A hydraulic control device for an auto transmission, comprising:
   an oil pump unit configured to supply oil;
   a line pressure control unit configured to form line pressure using the oil supplied from the oil pump unit;
   a lubricating pressure control unit configured to form lubricating pressure using the oil passing through the line pressure control unit;
   a reducing pressure control unit configured to form reducing pressure using the oil passing through the lubricating pressure control unit;
   a damper control pressure control unit configured to form damper control pressure using the oil supplied from the oil pump unit;
   a switch unit configured to supply the lubricating pressure or the reducing pressure to a torque converter while being operated by the damper control pressure;
   a collection unit configured to collect the lubricating pressure; and
   a retention unit connected to the switch unit, and configured to retain the lubricating pressure of the torque converter,
   wherein the line pressure control unit comprises:
      a line pressure flow path connected to the oil pump unit, and configured to guide oil; and
      a line pressure valve configured to open/close the line pressure flow path;
   wherein the lubricating pressure control unit comprises:
      a lubricating pressure flow path configured to connect the line pressure valve and the switch unit so as to guide oil; and
      a lubricating pressure valve configured to open/close the lubricating pressure flow path, and
   wherein the reducing pressure control unit comprises:
      a reducing pressure flow path configured to connect the lubricating pressure flow path and the switch unit so as to guide oil; and
      a reducing pressure valve configured to open/close the reducing pressure flow path.

5. The hydraulic control device of claim 4, wherein the damper pressure control unit comprises:
   a damper pressure flow path configured to connect the line pressure flow path, the switch unit and the torque converter so as to guide oil; and
   a damper pressure valve configured to open/close the damper pressure flow path.

6. The hydraulic control device of claim 5, wherein when a damper clutch operated by the damper control pressure is turned off, the switch unit connects an inlet of the torque converter and the lubricating pressure flow path, and connects an outlet of the torque converter and the collection unit.

7. The hydraulic control device of claim 6, wherein when the damper clutch operated by the damper control pressure is turned on, the switch unit connects the inlet of the torque converter and the reducing pressure flow path, and connects the lubricating pressure flow path and the collection unit.

8. The hydraulic control device of claim 1, wherein the switch unit comprises:
   an off switch unit configured to connect an inlet of the torque converter and the lubricating pressure control unit, and connect an outlet of the torque converter and the collection unit; and
   an on switch unit configured to connect the inlet and the reducing pressure control unit, and connect the lubricating pressure control unit and the collection unit.

9. A hydraulic control device for an auto transmission, comprising:
   an oil pump unit configured to supply oil;
   a line pressure control unit configured to form line pressure using the oil supplied from the oil pump unit;
   a lubricating pressure control unit configured to form lubricating pressure using the oil passing through the line pressure control unit;
   a reducing pressure control unit configured to form reducing pressure using the oil passing through the lubricating pressure control unit;
   a damper control pressure control unit configured to form damper control pressure using the oil supplied from the oil pump unit;

a switch unit configured to supply the lubricating pressure or the reducing pressure to a torque converter while being operated by the damper control pressure;

a collection unit configured to collect the lubricating pressure; and a retention unit connected to the switch unit, and configured to retain the lubricating pressure of the torque converter, wherein the switch unit comprises:
an off switch unit configured to connect an inlet of the torque converter and the lubricating pressure control unit, and connect an outlet of the torque converter and the collection unit; and an on switch unit configured to connect the inlet and the reducing pressure control unit, and connect the lubricating pressure control unit and the collection unit, and wherein the off switch unit comprises:
a first off switch connected to the reducing pressure control unit, and configured to restrict the movement of the reducing pressure;

a second off switch configured to connect the inlet and the lubricating pressure control unit, and guide the lubricating pressure to the inlet;

a third off switch configured to connect the outlet and the collection unit, and guide hydraulic pressure, discharged from the outlet, to the collection unit; and a fourth off switch connected to the retention unit, and configured to restrict the movement of hydraulic pressure of the retention unit.

10. The hydraulic control device of claim 8, wherein the on switch unit comprises:

a first on switch configured to connect the reducing pressure control unit and the inlet, and guide the reducing pressure to the inlet;

a second on switch configured to connect the lubricating pressure control unit and the collection unit, and guide the lubricating pressure to the collection unit; and a third on switch configured to connect the outlet and the retention unit.

11. The hydraulic control device of claim 10, wherein the retention unit is a check valve configured to discharge the oil of the outlet, when pressure thereof is equal to or more than preset pressure.

12. The hydraulic control device of claim 1, wherein the damper pressure control unit comprises:

a damper pressure flow path configured to connect the line pressure flow path, the switch unit and the torque converter so as to guide oil; and a damper pressure valve configured to open/close the damper pressure flow path.

13. The hydraulic control device of claim 12, wherein when a damper clutch operated by the damper control pressure is turned off, the switch unit connects an inlet of the torque converter and the lubricating pressure flow path, and connects an outlet of the torque converter and the collection unit.

14. The hydraulic control device of claim 13, wherein when the damper clutch operated by the damper control pressure is turned on, the switch unit connects the inlet of the torque converter and the reducing pressure flow path, and connects the lubricating pressure flow path and the collection unit.

* * * * *